(12) United States Patent
Mi et al.

(10) Patent No.: US 7,957,082 B2
(45) Date of Patent: Jun. 7, 2011

(54) TURNING FILM HAVING MULTIPLE SLOPES

(75) Inventors: Xiang-Dong Mi, Rochester, NY (US); Xinyu Zhu, Rochester, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 409 days.

(21) Appl. No.: 11/906,611

(22) Filed: Oct. 3, 2007

(65) Prior Publication Data
US 2009/0091836 A1 Apr. 9, 2009

(51) Int. Cl.
*G02B 5/04* (2006.01)
(52) U.S. Cl. .......................... 359/833; 359/837; 362/339
(58) Field of Classification Search .................. 359/831, 359/833, 837; 362/330, 339, 620, 626
See application file for complete search history.

(56) References Cited

U.S. PATENT DOCUMENTS

| | | | | |
|---|---|---|---|---|
| 586,220 | A * | 7/1897 | Basquin | 359/595 |
| 4,984,144 | A * | 1/1991 | Cobb et al. | 362/339 |
| 5,485,319 | A * | 1/1996 | Lemons | 359/833 |
| 6,011,602 | A * | 1/2000 | Miyashita et al. | 349/65 |
| 6,456,437 | B1 * | 9/2002 | Lea et al. | 359/625 |
| 6,692,133 | B2 * | 2/2004 | Katsu et al. | 362/620 |
| 6,746,130 | B2 | 6/2004 | Ohkawa | |
| 7,125,131 | B2 * | 10/2006 | Olczak | 362/19 |
| 7,139,125 | B1 * | 11/2006 | Mi | 359/487 |
| 7,153,017 | B2 * | 12/2006 | Yamashita et al. | 362/606 |
| 7,220,038 | B2 * | 5/2007 | Yamashita et al. | 362/606 |
| 7,297,386 | B2 * | 11/2007 | Suzuki et al. | 428/141 |
| 7,492,520 | B2 * | 2/2009 | Yokota | 359/599 |
| 7,578,607 | B2 * | 8/2009 | Yamashita et al. | 362/339 |

* cited by examiner

Primary Examiner — Ricky D Shafer
(74) Attorney, Agent, or Firm — Edwin Oh (57) ABSTRACT

The present invention provides a light redirecting article for redirecting light toward a target angle, the light redirecting article comprising: an input surface comprising a plurality of light redirecting structures each light redirecting structure having a near surface having two slopes, sloping away from normal in one direction as defined by a first inclination base angle $\beta_1$, a second inclination angle $\beta_2$, and a first half apex angle $\alpha_2$, for accepting incident illumination over a range of incident angles and a far surface sloping away from normal, in the opposite direction relative to the input surface, as defined by a second base angle $\gamma_1$ and a second half apex angle $\alpha_1$. The invention further provides an output surface opposing to the input surface wherein the near and far surfaces are opposed to each other at an angle ($\alpha_1+\alpha_2$) that is in the range from 60 to 70 degrees, and the base angle $\beta_1$ is in the range from 82 to 87 degrees.

5 Claims, 7 Drawing Sheets

TURNING FILM HAVING MULTIPLE SLOPES

FIELD OF THE INVENTION

This invention generally relates to display illumination articles for enhancing luminance from a surface and more particularly relates to a turning film having multiple slopes that redirects light from a light guiding plate.

BACKGROUND OF THE INVENTION

Liquid crystal displays (LCDs) continue to improve in cost and performance, becoming a preferred display type for many computer, instrumentation, and entertainment applications. The transmissive LCD used in conventional laptop computer displays is a type of backlit display, having a light providing surface positioned behind the LCD for directing light outwards, towards the LCD. The challenge of providing a suitable backlight apparatus having brightness that is sufficiently uniform while remaining compact and low cost has been addressed following one of two basic approaches. In the first approach, a light-providing surface is used to provide a highly scattered, essentially Lambertian light distribution, having an essentially constant luminance over a broad range of angles. Following this first approach, with the goal of increasing on-axis and near-axis luminance, a number of brightness enhancement films have been proposed for redirecting a portion of this light having Lambertian distribution in order to provide a more collimated illumination.

A second approach to providing backlight illumination employs a light guiding plate (LGP) that accepts incident light from a lamp or other light source disposed at the side and guides this light internally using Total Internal Reflection (TIR) so that light is emitted from the LGP over a narrow range of angles. The output light from the LGP is typically at a fairly steep angle with respect to normal, such as 70 degrees or more. With this second approach, a turning film, one type of light redirecting article, is then used to redirect the emitted light output from the LGP toward normal. Directional turning films, broadly termed light-redirecting articles or light-redirecting films, such as that provided with the HSOT (Highly Scattering Optical Transmission) light guide panel available from Clarex, Inc., Baldwin, N.Y., provide an improved solution for providing a uniform backlight of this type, without the need for diffusion films or for dot printing in manufacture. HSOT light guide panels and other types of directional turning films use arrays of prism structures, in various combinations, to redirect light from a light guiding plate toward normal, or toward some other suitable target angle that is typically near normal relative to the two-dimensional surface. As one example, U.S. Pat. No. 6,746,130 (Ohkawa) describes a light control sheet that acts as a turning film for LGP illumination.

Figure 1:
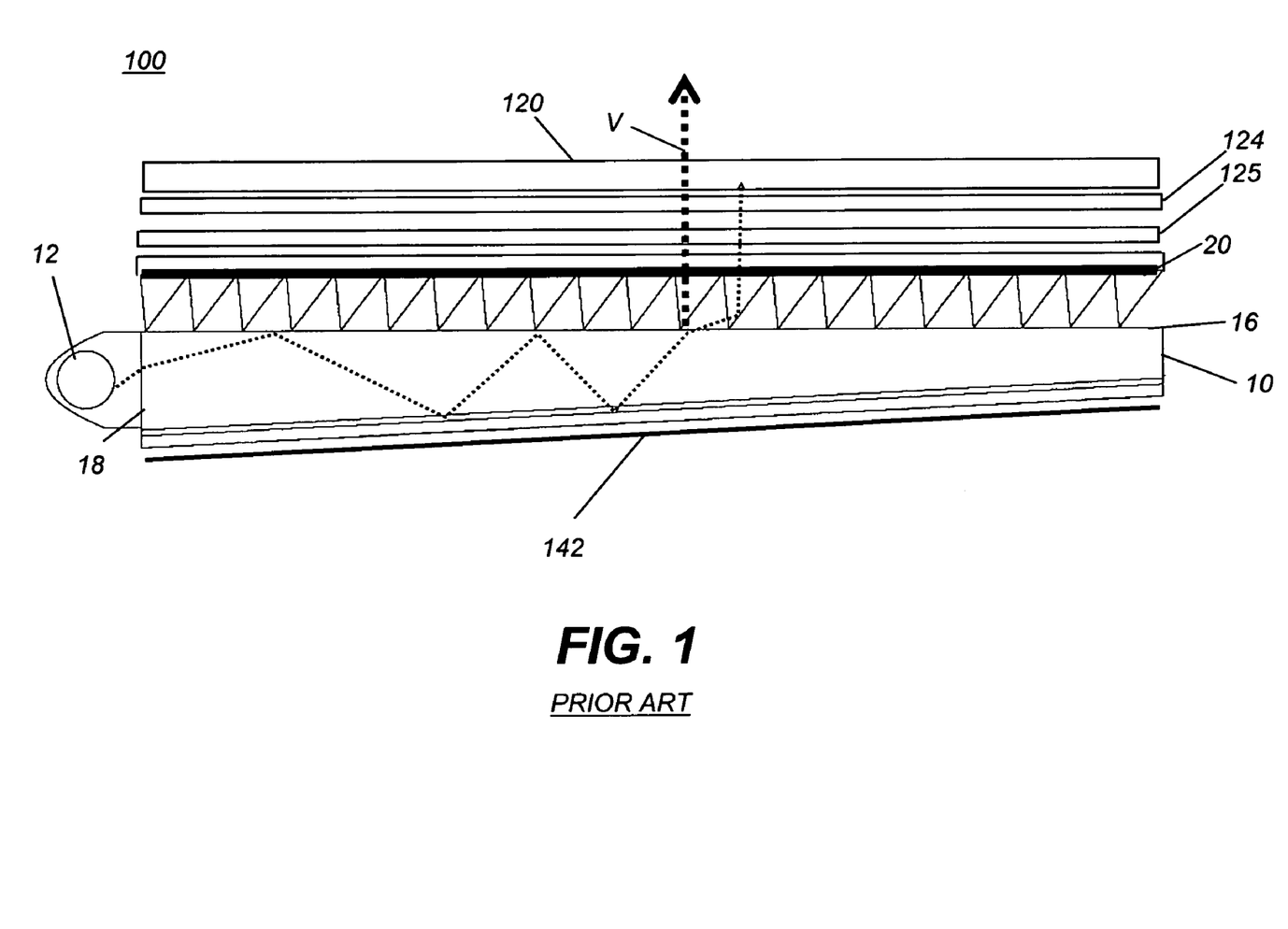
FIG. 1 is a cross sectional view showing components of a conventional display apparatus.

Referring to FIG. 1, the overall function of a light guiding plate 10 in a display apparatus 100 is shown. Light from a light source 12 is incident at an input surface 18 and passes into light guiding plate 10, which is typically wedge-shaped as shown. The light propagates within light guiding plate 10 until Total Internal Reflection (TIR) conditions are frustrated and then, possibly reflected from a reflective surface 142, exits light guiding plate at an output surface 16. This light then goes to a turning film 20 and is directed to illuminate a light-gating device 120 such as an LCD or other type of spatial light modulator or other two-dimensional backlit component that modulates the light. For optimized viewing under most conditions, the emitted light should be provided over a range of relatively narrow angles about a normal V. A polarizer 124 is typically disposed in the illumination path in order to provide light-gating device 120 such as a liquid crystal cell with suitably polarized light for modulation. A reflective polarizer 125 is often provided between absorptive polarizer 124 and turning film 20.

Figure 2:
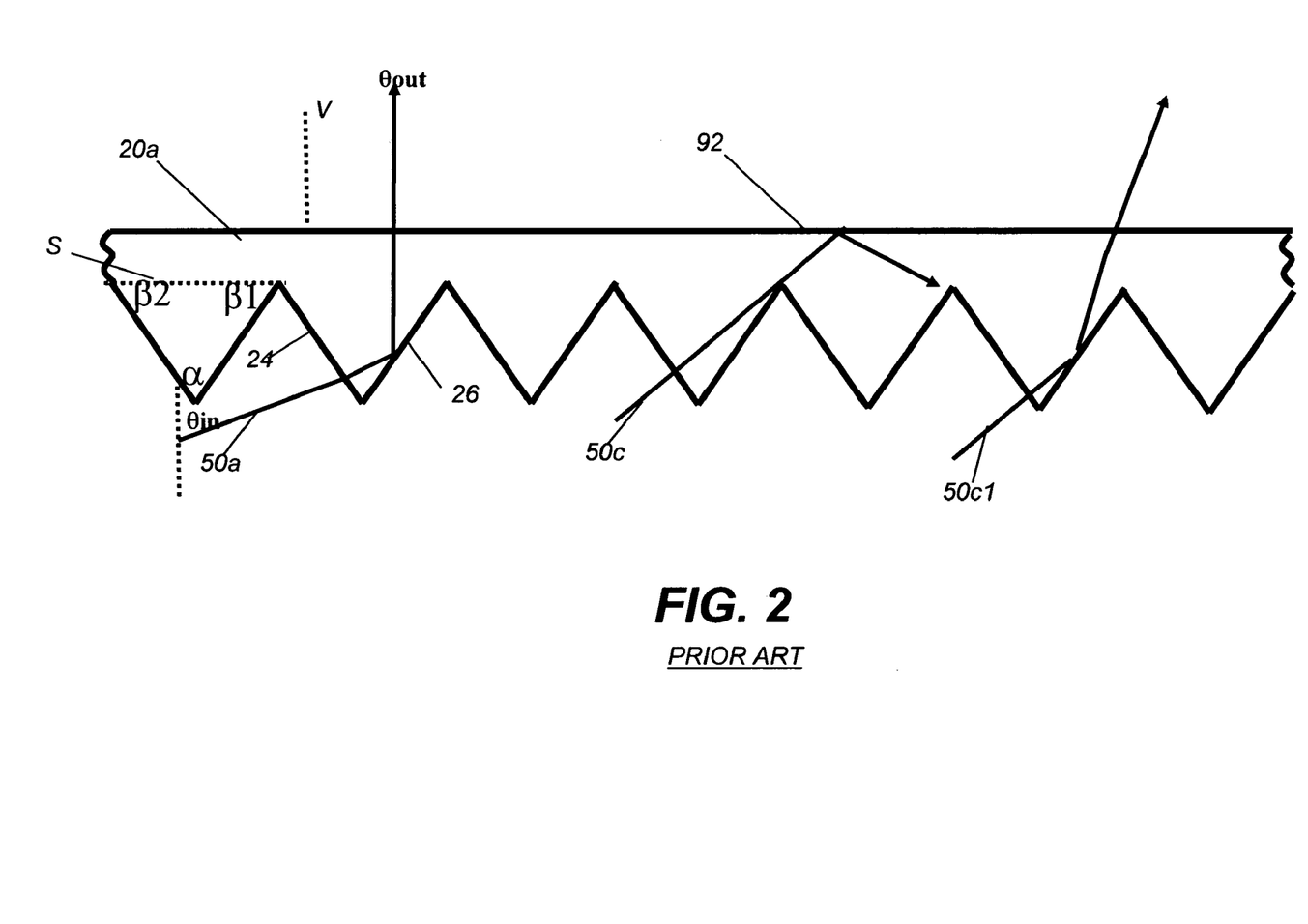
FIG. 2 is a schematic cross-sectional view showing a turning film with prismatic structure facing downward, toward the light guiding plate.

Referring to FIG. 2, there is shown a schematic cross-sectional view of a conventional turning film 20a used with light guiding plate 10, showing key angles and geometric relationships. Turning film 20a has a number of prismatic structures facing downward toward light guiding plate 10, each structure having a near surface 24 (being near relative to light source 12, as shown in the embodiment of FIG. 1) and a far surface 26, both sides slanted from a film normal direction V as determined by an apex angle α, and base angles β1 and β2, relative to a horizontal S. Light from light guiding plate 10 is incident over a small range of angles about a central input angle $\theta_{in}$. The output angle $\theta_{out}$ of light delivered to the LC display element at a flat surface 22 of turning film 20a is determined by a number of factors including the central input angle $\theta_{in}$, the refractive index n of turning film 20a, and the base angle β1 at which far surface 26 is slanted. Output angle $\theta_{out}$ for emitted light is preferably normal with respect to turning film 20a, however output angle $\theta_{out}$ can be considered a target angle, which may be at some inclination with respect to normal for some applications. For most conventional turning films, the target angle is normal. In a typical arrangement, base angles β1 and β2 are about 56 degrees, and apex angle α, 68 degrees. The primary ray 50a having an input angle around $\theta_{in} \approx 70°$ is redirected to near normal direction. However, some secondary rays 50c, 50c1 having an input angle around $\theta_{in} < 70°$ may take paths as shown in FIG. 2. Secondary ray 50c1 is redirected toward a relative large angle from the normal direction. Further, secondary ray 50c is totally reflected back by the light exiting surface 92. Consequently, the light utilization of this existing turning film is not satisfactory.

Thus, while there have been solutions proposed for turning films suitable for some types of display apparatus and applications, there remains a need for improved turning films.

SUMMARY OF THE INVENTION

The present invention provides a light redirecting article for redirecting light toward a target angle, the light redirecting article comprising: (a) an input surface comprising a plurality of light redirecting structures each light redirecting structure having: (i) a near surface having two slopes, sloping away from normal in one direction as defined by a first inclination base angle $\beta_1$, a second inclination angle $\beta_2$, and a first half apex angle $\alpha_2$, for accepting incident illumination over a range of incident angles; (ii) a far surface sloping away from normal, in the opposite direction relative to the input surface, as defined by a second base angle $\gamma_1$ and a second half apex angle $\alpha_1$; and (b) an output surface opposing to the input surface wherein the near and far surfaces are opposed to each other at an angle $(\alpha_1+\alpha_2)$ that is in the range from 60 to 70 degrees, and the base angle $\beta_1$ is in the range from 82 to 87 degrees.

The present invention further provides a light redirecting article for redirecting light toward a target angle, the light redirecting article comprising: (a) an input surface comprising a plurality of light redirecting structures each light redirecting structure having: (i) a near surface having two slopes, sloping away from normal in one direction as defined by a first inclination base angle $\beta_1$, a second inclination angle $\beta_2$, and a first half apex angle $\alpha_2$, for accepting incident illumination over a range of incident angles, the first inclination base angle $\beta_1$ being the angle nearest to the substrate of the film, the second inclination angle $\beta_2$ being the angle farthest from the substrate of the film; (ii) a far surface sloping away from normal, in the opposite direction relative to the input surface, as defined by a second base angle $\gamma_1$ and a second half apex angle $\alpha_1$; and (b) an output surface wherein $\beta_2-\beta_2$ is at least 20 degrees.

The present invention further provides a light redirecting article for redirecting light toward a target angle, the light redirecting article comprising: (a) an input surface comprising a plurality of light redirecting structures having a pitch P, each light redirecting structure having: (i) a near surface having two slopes, sloping away from normal in one direction as defined by a first inclination base angle $\beta_1$, a second inclination angle $\beta_2$, a first projection segment onto the substrate having a length $L_1$, and a second projection segment onto the substrate having a length $L_2$, and a first half apex angle $\alpha_2$, for accepting incident illumination over a range of incident angles, the first inclination base angle $\beta_1$ being the angle nearest to the substrate of the film, the second inclination angle $\beta_2$ being the angle farthest from the substrate of the film; (ii) a far surface sloping away from normal, in the opposite direction relative to the input surface, as defined by a second base angle $\gamma_1$ and a second half apex angle $\alpha_1$; and (b) an output surface wherein the ratio $L_1/P$ is in the range of 0.06 and 0.08 and the ratio $L_2/P$ is in the range of 0.152 and 0.238.

DETAILED DESCRIPTION OF THE INVENTION

The apparatus of the present invention uses light-redirecting structures that are generally shaped as prisms. True prisms have at least two planar faces. Because, however, one or more surfaces of the light-redirecting structures need not be planar in all embodiments, but may be curved or have multiple sections, the more general term "light redirecting structure" is used in this specification.

Figure 3A:
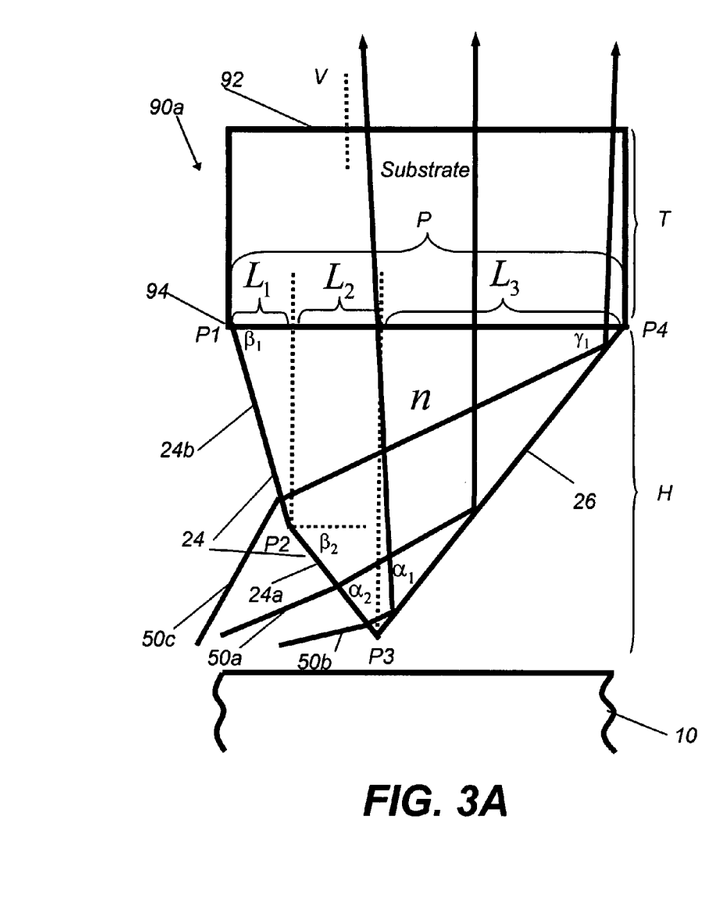
FIG. 3A is a schematic cross-sectional view showing a single unit of a turning film having two slopes on the near surface of the prismatic structures according to the present invention.

Referring to FIG. 3A-3D, key features of the improved turning film of the present invention are shown. FIG. 3A shows one unit of a turning film 90a according to the present invention, which comprises a substrate having a light inputting surface 94 and a light exiting surface 92. On the side of the light inputting surface 94 of the film 90a is a prismatic structure which is described by points P1, P2, P3, and P4 and characterized by a near surface 24 and a far surface 26, and the near surface is composed of at least first flat segment 24a and second flat segment 24b, the angle $\beta_2$ between the first segment 24a and the horizontal direction S is smaller than the angle $\beta_1$ between the second segment 24b and the horizontal direction S. The prismatic structure can be further described by two half apex angles $\alpha_1$ and $\alpha_2$, the pitch P and height H, and three projection dimensions $L_1, L_2,$ and $L_3$. The prismatic structure is made of a material of refractive index n, and the substrate may have its index of refraction greater than, equal to, or less than n. The shape and the refractive index n of the prismatic structure are chosen so that the primary ray 50a from the light guide plate 10, secondary ray 50b having larger incident angle than the primary ray 50a, and secondary ray 50c having smaller incident angle than the primary ray 50a are characterized as following: the primary ray 50a is refracted by the first segment 24a of the near surface 24, subsequently reflected due to the total internal reflection at the far surface 26, and finally emerges out toward the target angle (normally within 5 degrees from the normal of the film); the secondary ray 50b is also refracted by the first segment 24a of the near surface 24, subsequently reflected due to the total internal reflection at the far surface 26, and finally emerges out in a direction that is bent more from its original direction than the primary ray 50a; and the secondary ray 50c is refracted by the second segment 24b of the near surface 24, subsequently reflected due to the total internal reflection at the far surface 26, and finally emerges out in a direction that is closer to the target direction than it would if the second segment 24b has the same slope as the first segment 24a.

Inventive (denoted as "I") and comparative examples (denoted as "C") of turning film 90a are shown in Table 1-Table 5. In all of these examples, refractive index n is held constant at 1.5, and pitch P of the prisms is about 50 μm, though it can be in the range of 15 to 150 μm, preferably in the range of 20 to 75 μm, more preferably in the range of 25 to 50 μm. When n and P are held constant, there are 4 independent parameters to specify the shape of turning film 90a, which are chosen to be $L_1/P$, $L_2/P$, $\beta_1$, and $\beta_2$. The height H and angles can be calculated as $$H = P[l_1 \tan(\beta_1) + l_2 \tan(\beta_2)],$$

$$\alpha_1 = \tan^{-1}\left(\frac{1 - l_1 - l_2}{h}\right),$$

$$\alpha_2 = 90° - \beta_2$$

$$\alpha \equiv \alpha_1 + \alpha_2$$

$$\gamma_1 = 90° - \alpha_1,$$

where $l_1 \equiv \frac{L_1}{P}, l_2 \equiv \frac{L_2}{P}, h \equiv \frac{H}{P}.$ When $\alpha_1=\alpha_2$, it follows $$l_2 = \frac{1-l_1}{2} - \frac{l_1}{2}\frac{\tan(\beta_1)}{\tan(\beta_2)},$$

or $$l_1 = \frac{1-2l}{1+\frac{\tan(\beta_1)}{\tan(\beta_2)}}.$$

In Table 1-4, Columns $L_1/P$, $\alpha_1$, and $\alpha_2$ are independent parameters.

$$L_2/P = l_2 = \frac{1-l_1}{2} - \frac{l_1}{2}\frac{\tan(\beta_1)}{\tan(\beta_2)}$$

to ensure $\alpha_1=\alpha_2=90°-\beta_2$, and $\alpha\equiv2\alpha_1$. The four right most columns represent the output of turning film in terms of total power, maximum intensity ratio, maximum intensity angle, and on-axis intensity ratio. The turning film of the present invention has: Power $\geqq85\%$, Maximum intensity ratio $\geqq1.1$ and Maximum intensity angle is within $-5°$ and $-5°$.

TABLE 1

Impact of $\beta_1$

| Ex | $L_1/P$ | $L_2/P$ | $\beta_1$ (°) | $\beta_2$ (°) | $\alpha_1$ (°) | $\alpha_2$ (°) | $\alpha$ (°) | Power | Maximum Intensity Ratio | Maximum Intensity angle (°) | On-axis Intensity ratio |
|---|---|---|---|---|---|---|---|---|---|---|---|
| C1.1 | 0.077 | 0.31422 | 80 | 56 | 34 | 34 | 68 | 0.856 | 0.967 | 3.5 | 0.940 |
| C1.2 | 0.077 | 0.27672 | 82 | 56 | 34 | 34 | 68 | 0.872 | 1.035 | 4.5 | 0.920 |
| C1.3 | 0.077 | 0.25000 | 83 | 56 | 34 | 34 | 68 | 0.882 | 1.094 | 3.5 | 0.997 |
| I1.1 | 0.077 | 0.21443 | 84 | 56 | 34 | 34 | 68 | 0.888 | 1.154 | 2.5 | 1.074 |
| I1.2 | 0.077 | 0.16633 | 85 | 56 | 34 | 34 | 68 | 0.892 | 1.195 | 0.5 | 1.172 |
| C1.4 | 0.077 | 0.09013 | 86 | 56 | 34 | 34 | 68 | 0.896 | 1.034 | -4.5 | 0.961 |

In Table 1, Ex. C1.1-C1.4 and I1.1-I1.2 show the impact of $\beta_1$, given $L_1/P=0.077$, and $\beta_2=56°$. Turning films of inventive examples I1.1 and I1.2 meet the criteria: high power (>0.88), large maximum peak intensity ratio (>1.15), and small maximum intensity angle from the normal ($\leqq\pm3°$). When $\beta_1$ is out of the preferred range between 83.5° and 85.5°, other parameters being equal except $L_2/P$, which is determined by $$L_2/P = \frac{1-L_1/P}{2} - \frac{L_1/P}{2}\frac{\tan(\beta_1)}{\tan(\beta_2)}$$

to keep $\alpha_1=\alpha_2=\alpha/2$, the outputs from comparative examples C1.1-C1.4 do not meet all of the criteria, in terms of power (>0.85), maximum intensity ratio (>1.10), and maximum intensity angle ($\leqq\pm5°$), indicating inferior performance.

TABLE 2

Impact of $L_1/P$

| Ex | $L_1/P$ | $L_2/P$ | $\beta_1$ (°) | $\beta_2$ (°) | $\alpha_1$ (°) | $\alpha_2$ (°) | $\alpha$ (°) | Power | Maximum Intensity Ratio | Maximum Intensity angle (°) | On-axis Intensity ratio |
|---|---|---|---|---|---|---|---|---|---|---|---|
| C2.1 | 0.04 | 0.32581 | 85 | 56 | 34 | 34 | 68 | 0.860 | 0.988 | 2.5 | 0.911 |
| C2.2 | 0.05 | 0.28226 | 85 | 56 | 34 | 34 | 68 | 0.874 | 1.075 | 4.5 | 0.934 |
| I2.1 | 0.06 | 0.23871 | 85 | 56 | 34 | 34 | 68 | 0.886 | 1.133 | 3.5 | 1.010 |
| I2.2 | 0.062 | 0.23000 | 85 | 56 | 34 | 34 | 68 | 0.887 | 1.113 | 4.5 | 1.043 |
| I2.3 | 0.064 | 0.22129 | 85 | 56 | 34 | 34 | 68 | 0.888 | 1.133 | 2.5 | 1.051 |
| I2.4 | 0.066 | 0.21258 | 85 | 56 | 34 | 34 | 68 | 0.889 | 1.157 | 2.5 | 1.069 |
| I2.5 | 0.068 | 0.20387 | 85 | 56 | 34 | 34 | 68 | 0.890 | 1.164 | 3.5 | 1.093 |
| I2.6 | 0.07 | 0.19516 | 85 | 56 | 34 | 34 | 68 | 0.891 | 1.185 | 2.5 | 1.100 |
| I2.7 | 0.072 | 0.18645 | 85 | 56 | 34 | 34 | 68 | 0.892 | 1.218 | 2.5 | 1.134 |
| I2.8 | 0.074 | 0.17774 | 85 | 56 | 34 | 34 | 68 | 0.892 | 1.180 | 1.5 | 1.152 |
| I2.9 | 0.075 | 0.17339 | 85 | 56 | 34 | 34 | 68 | 0.892 | 1.204 | 1.5 | 1.158 |
| I2.10 | 0.076 | 0.16903 | 85 | 56 | 34 | 34 | 68 | 0.892 | 1.198 | 0.5 | 1.165 |
| I2.11 | 0.077 | 0.16468 | 85 | 56 | 34 | 34 | 68 | 0.892 | 1.184 | 0.5 | 1.174 |
| I2.12 | 0.078 | 0.16032 | 85 | 56 | 34 | 34 | 68 | 0.892 | 1.188 | 0.5 | 1.184 |
| I2.13 | 0.079 | 0.15597 | 85 | 56 | 34 | 34 | 68 | 0.893 | 1.192 | -0.5 | 1.175 |
| I2.14 | 0.08 | 0.15161 | 85 | 56 | 34 | 34 | 68 | 0.893 | 1.171 | -0.5 | 1.167 |
| C2.5 | 0.09 | 0.10806 | 85 | 56 | 34 | 34 | 68 | 0.895 | 1.096 | -2.5 | 1.024 |
| C2.6 | 0.1 | 0.06452 | 85 | 56 | 34 | 34 | 68 | 0.898 | 0.982 | -5.5 | 0.883 |

TABLE 2-continued

Impact of $L_1/P$

| Ex | $L_1/P$ | $L_2/P$ | $\beta_1$ (°) | $\beta_2$ (°) | $\alpha_1$ (°) | $\alpha_2$ (°) | $\alpha$ (°) | Power | Maximum Intensity Ratio | Maximum Intensity angle (°) | On-axis Intensity ratio |
|---|---|---|---|---|---|---|---|---|---|---|---|
| C2.7  | 0.114 | 0.00355 | 85 | 56 | 34 | 34 | 68 | 0.900 | 1.089 | 2.5 | 1.036 |
| I2.15 | 0.075 | 0.22184 | 84 | 56 | 34 | 34 | 68 | 0.888 | 1.150 | 3.5 | 1.056 |
| I2.16 | 0.076 | 0.21813 | 84 | 56 | 34 | 34 | 68 | 0.888 | 1.142 | 2.5 | 1.053 |
| I2.17 | 0.077 | 0.21443 | 84 | 56 | 34 | 34 | 68 | 0.888 | 1.154 | 2.5 | 1.074 |
| I2.18 | 0.078 | 0.21072 | 84 | 56 | 34 | 34 | 68 | 0.888 | 1.145 | 2.5 | 1.071 |
| I2.19 | 0.079 | 0.20701 | 84 | 56 | 34 | 34 | 68 | 0.889 | 1.163 | 4.5 | 1.082 |
| I2.20 | 0.08  | 0.20330 | 84 | 56 | 34 | 34 | 68 | 0.890 | 1.165 | 2.5 | 1.127 |

In Table 2, comparative examples C2.1-C2.7 and inventive examples I2.1-I2.14 show the impact of $L_1/P$ when $\beta_1=85°$, $\beta_2=56°$. When $L_1/P$ is out of the preferred range between 0.06 and 0.08, other parameters being equal except $L_2/P$, which is determined by $$L_2/P = \frac{1 - L_1/P}{2} - \frac{L_1/P}{2}\frac{\tan(\beta_1)}{\tan(\beta_2)}$$

to keep $\alpha_1=\alpha_2=\alpha/2$, the output in terms of power (>0.85), maximum intensity ratio ($\geqq 1.10$), and maximum intensity angle ($\leqq \pm 5°$) is not acceptable. Table 2 also includes inventive examples I2.15-I2.20 when $\beta_1=84°$, $\beta_2=56°$.

TABLE 3

Impact of $\beta_2$

| Ex | $L_1/P$ | $L_2/P$ | $\beta_1$ (°) | $\beta_2$ (°) | $\alpha_1$ (°) | $\alpha_2$ (°) | $\alpha$ (°) | Power | Maximum Intensity Ratio | Maximum Intensity angle (°) | On-axis Intensity ratio |
|---|---|---|---|---|---|---|---|---|---|---|---|
| C3.1 | 0.076 | 0.21123 | 85 | 60 | 30 | 30 | 60 | 0.895 | 1.081 | −9.5 | 0.655 |
| C3.2 | 0.076 | 0.20102 | 85 | 59 | 31 | 31 | 62 | 0.894 | 1.124 | −7.5 | 0.859 |
| I3.1 | 0.076 | 0.19059 | 85 | 58 | 32 | 32 | 64 | 0.893 | 1.144 | −2.5 | 1.026 |
| I3.2 | 0.076 | 0.17994 | 85 | 57 | 33 | 33 | 66 | 0.892 | 1.183 | −1.5 | 1.140 |
| I3.3 | 0.076 | 0.16903 | 85 | 56 | 34 | 34 | 68 | 0.892 | 1.198 | 0.5 | 1.165 |
| I3.4 | 0.076 | 0.15787 | 85 | 55 | 35 | 35 | 70 | 0.893 | 1.194 | 2.5 | 1.027 |
| I3.5 | 0.076 | 0.14643 | 85 | 54 | 36 | 36 | 72 | 0.893 | 1.138 | 4.5 | 0.830 |
| C3.3 | 0.076 | 0.13470 | 85 | 53 | 37 | 37 | 74 | 0.890 | 1.075 | 7.5 | 0.601 |
| C3.4 | 0.076 | 0.12265 | 85 | 52 | 38 | 38 | 76 | 0.888 | 1.042 | 9.5 | 0.421 |

In Table 3, comparative examples C3.1-C3.4 and inventive examples I3.1-I3.5 show the impact of $\beta_2$ when $L_1/P=0.076$ and $\beta_1=85°$. When $L_1/P$ is out of the preferred range between 58.5° and 53.5°, other parameters being equal except $L_2/P$, which is determined by $$L_2/P = \frac{1 - L_1/P}{2} - \frac{L_1/P}{2}\frac{\tan(\beta_1)}{\tan(\beta_2)}$$

to keep $\alpha_1=\alpha_2\alpha/2$, the output in terms of power (>0.85), maximum intensity ratio ($\geqq 1.10$), and maximum intensity angle ($\leqq \pm 5°$) is not acceptable.

TABLE 4

Asymmetrical Turning Film Having $\alpha_1 \neq \alpha_2$

| Ex | $L_1/P$ | $L_2/P$ | $\beta_1$ (°) | $\beta_2$ (°) | $\alpha_1$ (°) | $\alpha_2$ (°) | $\alpha$ (°) | Power | Maximum Intensity Ratio | Maximum Intensity angle (°) | On-axis Intensity ratio |
|---|---|---|---|---|---|---|---|---|---|---|---|
| C4.1 | 0.01 | 0.17 | 85 | 56 | 65.93 | 34 | 99.93 | 0.732 | 0.874 | 27.5 | 0.031 |
| C4.2 | 0.03 | 0.17 | 85 | 56 | 53.36 | 34 | 87.36 | 0.715 | 0.640 | 15.5 | 0.063 |
| C4.3 | 0.05 | 0.17 | 85 | 56 | 43.44 | 34 | 77.44 | 0.858 | 0.983 | 29.5 | 0.146 |
| C4.4 | 0.07 | 0.17 | 85 | 56 | 35.84 | 34 | 69.84 | 0.891 | 1.177 | 6.5 | 0.837 |
| C4.5 | 0.09 | 0.17 | 85 | 56 | 30.02 | 34 | 64.02 | 0.897 | 1.179 | −9.5 | 0.628 |
| C4.6 | 0.11 | 0.17 | 85 | 56 | 25.50 | 34 | 59.50 | 0.898 | 0.822 | −18.5 | 0.171 |
| C4.7 | 0.13 | 0.17 | 85 | 56 | 21.94 | 34 | 55.94 | 0.886 | 1.011 | 23.5 | 0.064 |
| C4.8 | 0.15 | 0.17 | 85 | 56 | 19.07 | 34 | 53.07 | 0.878 | 1.055 | 28.5 | 0.038 |
| C4.9 | 0.17 | 0.17 | 85 | 56 | 16.73 | 34 | 50.73 | 0.872 | 1.062 | 30.5 | 0.033 |
| C4.10 | 0.19 | 0.17 | 85 | 56 | 14.79 | 34 | 48.79 | 0.864 | 1.038 | 35.5 | 0.109 |
| C4.11 | 0.01 | 0.19 | 85 | 56 | 63.67 | 34 | 97.67 | 0.687 | 0.764 | 23.5 | 0.035 |
| C4.12 | 0.03 | 0.19 | 85 | 56 | 51.31 | 34 | 85.31 | 0.751 | 0.544 | 8.5 | 0.086 |
| C4.13 | 0.05 | 0.19 | 85 | 56 | 41.69 | 34 | 75.69 | 0.864 | 1.033 | 24.5 | 0.170 |
| I4.1 | 0.07 | 0.19 | 85 | 56 | 34.37 | 34 | 68.37 | 0.891 | 1.175 | 3.5 | 1.075 |
| C4.14 | 0.09 | 0.19 | 85 | 56 | 28.79 | 34 | 62.79 | 0.898 | 1.165 | −12.5 | 0.464 |
| C4.15 | 0.11 | 0.19 | 85 | 56 | 24.46 | 34 | 58.46 | 0.898 | 0.768 | 15.5 | 0.131 |
| C4.16 | 0.13 | 0.19 | 85 | 56 | 21.04 | 34 | 55.04 | 0.887 | 1.013 | 23.5 | 0.054 |
| C4.17 | 0.15 | 0.19 | 85 | 56 | 18.30 | 34 | 52.30 | 0.878 | 1.111 | 29.5 | 0.036 |
| C4.18 | 0.17 | 0.19 | 85 | 56 | 16.05 | 34 | 50.05 | 0.870 | 1.109 | 33.5 | 0.039 |
| C4.19 | 0.19 | 0.19 | 85 | 56 | 14.18 | 34 | 48.18 | 0.864 | 1.024 | 36.5 | 0.134 |
| I4.2 | 0.076 | 0.169 | 85 | 50 | 35.2 | 40 | 75.2 | 0.892 | 1.124 | 4.5 | 0.809 |
| I4.3 | 0.076 | 0.169 | 85 | 51 | 35 | 39 | 74 | 0.892 | 1.131 | 3.5 | 0.866 |
| I4.4 | 0.076 | 0.169 | 85 | 52 | 34.8 | 38 | 72.8 | 0.893 | 1.138 | 3.5 | 0.940 |
| I4.5 | 0.076 | 0.169 | 85 | 53 | 34.6 | 37 | 71.6 | 0.893 | 1.135 | 3.5 | 1.031 |
| I4.6 | 0.076 | 0.169 | 85 | 54 | 34.4 | 36 | 70.4 | 0.893 | 1.159 | 2.5 | 1.083 |
| I4.7 | 0.076 | 0.169 | 85 | 55 | 34.2 | 35 | 69.2 | 0.892 | 1.166 | 1.5 | 1.135 |
| I4.8 | 0.076 | 0.169 | 85 | 56 | 34 | 34 | 68 | 0.892 | 1.190 | 0.5 | 1.168 |
| I4.9 | 0.076 | 0.169 | 85 | 57 | 33.8 | 33 | 66.8 | 0.892 | 1.192 | 0.5 | 1.173 |
| I4.10 | 0.076 | 0.169 | 85 | 58 | 33.5 | 32 | 65.5 | 0.892 | 1.191 | 0.5 | 1.179 |
| I4.11 | 0.076 | 0.169 | 85 | 59 | 33.3 | 31 | 64.3 | 0.892 | 1.187 | −2.5 | 1.156 |
| I4.12 | 0.076 | 0.169 | 85 | 60 | 33 | 30 | 63 | 0.893 | 1.172 | −1.5 | 1.113 |
| C4.20 | 0.076 | 0.1 | 85 | 56 | 39 | 34 | 73 | 0.889 | 1.045 | 11.5 | 0.339 |
| C4.21 | 0.076 | 0.12 | 85 | 56 | 37.5 | 34 | 71.5 | 0.891 | 1.112 | 7.5 | 0.616 |
| C4.22 | 0.076 | 0.14 | 85 | 56 | 36.1 | 34 | 70.1 | 0.893 | 1.156 | 5.5 | 0.887 |
| I4.13 | 0.076 | 0.16 | 85 | 56 | 34.6 | 34 | 68.6 | 0.892 | 1.179 | 1.5 | 1.112 |
| I4.14 | 0.076 | 0.18 | 85 | 56 | 33.2 | 34 | 67.2 | 0.891 | 1.180 | 0.5 | 1.177 |
| I4.15 | 0.076 | 0.2 | 85 | 56 | 31.9 | 34 | 65.9 | 0.892 | 1.156 | −3.5 | 1.054 |
| C4.23 | 0.076 | 0.22 | 85 | 56 | 30.5 | 34 | 64.5 | 0.894 | 1.125 | −7.5 | 0.861 |
| C4.24 | 0.076 | 0.24 | 85 | 56 | 29.2 | 34 | 63.2 | 0.895 | 1.092 | −9.5 | 0.631 |
| C4.25 | 0.076 | 0.26 | 85 | 56 | 27.9 | 34 | 61.9 | 0.895 | 1.050 | −12.5 | 0.465 |
| C4.26 | 0.076 | 0.28 | 85 | 56 | 26.6 | 34 | 60.6 | 0.895 | 1.005 | −16.5 | 0.352 |
| C4.27 | 0.076 | 0.3 | 85 | 56 | 25.4 | 34 | 59.4 | 0.894 | 0.968 | −22.5 | 0.261 |
| C4.28 | 0.076 | 0.32 | 85 | 56 | 24.2 | 34 | 58.2 | 0.893 | 0.928 | −24.5 | 0.184 |
| C4.29 | 0.076 | 0.34 | 85 | 56 | 23 | 34 | 57 | 0.890 | 0.902 | −25.5 | 0.127 |

Table 4 shows that it is possible to have asymmetrical turning film as shown in Inventive example I4.1-I4.15 to provide acceptable output in terms of power ($\geqq 0.85$), maximum intensity ratio ($\geqq 1.10$), and maximum intensity angle ($\leqq \pm 5°$), while randomly choosing parameters do not provide satisfactory results, as shown in comparative examples C4.1-C4.29. In general, the difference between $\alpha_1$ and $\alpha_2$ is preferably within 5°.

TABLE 5

Impact of Refractive Index n

| Ex | n | Power | Maximum Intensity Ratio | Maximum Intensity angle (°) | On-axis Intensity ratio |
|---|---|---|---|---|---|
| C5.1 | 1.13 | 0.881 | 1.053 | 7.5 | 0.119 |
| I5.1 | 1.14 | 0.880 | 1.202 | 6.5 | 0.147 |
| I5.2 | 1.15 | 0.879 | 1.383 | 5.5 | 0.2 |
| I5.3 | 1.16 | 0.877 | 1.482 | 4.5 | 0.262 |
| I5.4 | 1.17 | 0.877 | 1.523 | 4.5 | 0.297 |
| I5.5 | 1.18 | 0.879 | 1.491 | 3.5 | 0.413 |
| I5.6 | 1.19 | 0.883 | 1.633 | 2.5 | 0.541 |
| I5.7 | 1.2 | 0.887 | 1.467 | 1.5 | 0.938 |
| I5.8 | 1.21 | 0.894 | 1.601 | 0.5 | 1.401 |
| I5.9 | 1.22 | 0.901 | 1.690 | 0.5 | 1.612 |
| I5.10 | 1.23 | 0.909 | 1.567 | −1.5 | 1.431 |
| I5.11 | 1.24 | 0.912 | 1.528 | 0.5 | 1.468 |
| I5.12 | 1.25 | 0.915 | 1.476 | 0.5 | 1.427 |
| I5.13 | 1.26 | 0.917 | 1.485 | −1.5 | 1.359 |
| I5.14 | 1.27 | 0.921 | 1.403 | 0.5 | 1.399 |
| I5.15 | 1.28 | 0.921 | 1.335 | −1.5 | 1.293 |
| I5.16 | 1.29 | 0.923 | 1.326 | −0.5 | 1.292 |
| I5.17 | 1.3 | 0.923 | 1.269 | −0.5 | 1.243 |
| I5.18 | 1.31 | 0.924 | 1.302 | −1.5 | 1.231 |
| I5.19 | 1.32 | 0.924 | 1.257 | −2.5 | 1.238 |
| I5.20 | 1.33 | 0.923 | 1.287 | −1.5 | 1.243 |
| I5.21 | 1.34 | 0.922 | 1.254 | −0.5 | 1.251 |
| I5.22 | 1.35 | 0.921 | 1.240 | 0.5 | 1.238 |
| I5.23 | 1.36 | 0.920 | 1.223 | 1.5 | 1.212 |
| I5.24 | 1.37 | 0.918 | 1.227 | 0.5 | 1.222 |

TABLE 5-continued

Impact of Refractive Index n

| Ex | n | Power | Maximum Intensity Ratio | Maximum Intensity angle (°) | On-axis Intensity ratio |
|---|---|---|---|---|---|
| I5.25 | 1.38 | 0.917 | 1.231 | −0.5 | 1.22 |
| I5.26 | 1.39 | 0.914 | 1.219 | −0.5 | 1.204 |
| I5.27 | 1.4 | 0.912 | 1.216 | 0.5 | 1.215 |
| I5.28 | 1.41 | 0.910 | 1.231 | 0.5 | 1.224 |
| I5.29 | 1.42 | 0.909 | 1.242 | 0.5 | 1.226 |
| I5.30 | 1.43 | 0.906 | 1.213 | 0.5 | 1.202 |
| I5.31 | 1.44 | 0.905 | 1.238 | 0.5 | 1.202 |
| I5.32 | 1.45 | 0.903 | 1.227 | 0.5 | 1.199 |
| I5.33 | 1.46 | 0.900 | 1.224 | 0.5 | 1.193 |
| I5.34 | 1.47 | 0.898 | 1.205 | 0.5 | 1.188 |
| I5.35 | 1.48 | 0.896 | 1.202 | 1.5 | 1.179 |
| I5.36 | 1.49 | 0.894 | 1.196 | 1.5 | 1.179 |
| I5.37 | 1.50 | 0.892 | 1.204 | 1.5 | 1.158 |
| I5.38 | 1.51 | 0.889 | 1.191 | 1.5 | 1.140 |
| I5.39 | 1.52 | 0.887 | 1.157 | 0.5 | 1.139 |
| I5.40 | 1.53 | 0.885 | 1.155 | 2.5 | 1.132 |
| I5.41 | 1.54 | 0.884 | 1.192 | 1.5 | 1.120 |
| I5.42 | 1.55 | 0.881 | 1.149 | 2.5 | 1.091 |
| I5.43 | 1.66 | 0.861 | 1.113 | 3.5 | 1.022 |
| C5.2 | 1.67 | 0.860 | 1.074 | 4.5 | 0.991 |

Table 5 show the impact of refractive index n, when $L_1/P=0.075$, $\beta_1=85°$, $\beta_2=56°$, and $$L_2/P = \frac{1-L_1/P}{2} - \frac{L_1/P}{2}\frac{\tan(\beta_1)}{\tan(\beta_2)} = 0.17339,$$

$\alpha_1=\alpha_2=\alpha/2=34°$. Inventive examples I5.1-I5.43 show that the index n is preferably in the range between 1.15 and 1.66, more preferably between 1.18 and 1.55, most preferably between 1.19 and 1.31, for a high power, and high maximum intensity ratio, while keeping the maximum intensity angle within 5° from the normal. When n is between 1.15 and 1.28, the maximum intensity ratio is greater than 1.3, sometimes is greater 1.6, which is significantly greater than the maximum intensity ratio of about 1.2 when n=1.5. For comparative examples C5.1 and C5.2, the maximum intensity is lower than 1.1.

For the turning film 90a according to the present invention, the inclination angle of one of flat surfaces closest to light exit surface, is $\beta_1=85°$, and the inclination angle of the other one of flat surfaces farthest from light exit surface, is $\beta_2=56°$.

Comparison Between Prior Art Examples and Inventive Examples

| Ex | $L_1/P$ | $L_2/P$ | $\beta_1$ (°) | $\beta_2$ (°) | $\alpha_1$ (°) | $\alpha_2$ (°) | $\alpha$ (°) | Power | Maximum Intensity Ratio | Maximum Intensity angle (°) | On-axis Intensity ratio |
|---|---|---|---|---|---|---|---|---|---|---|---|
| C1 | 0.5 | 0 | 56 | 56 | 34 | 34 | 68 | 0.786 | 1.072 | 0.5 | 1.047 |
| C2 | 0.122 | 0.0 | 84.4 | 84.4 | 35.2 | 5.6 | 40.8 | 0.902 | 1.174 | −1.5 | 1.157 |
| I1.1 | 0.077 | 0.21443 | 84 | 56 | 34 | 34 | 68 | 0.888 | 1.154 | 2.5 | 1.074 |
| I1.2 | 0.077 | 0.16633 | 85 | 56 | 34 | 34 | 68 | 0.892 | 1.195 | 0.5 | 1.172 |

Comparative example C1 is the same as inventive example I1.1 except that it has only one slope. The comparative example C1 has much lower power of around 0.79, and lower maximum intensity ratio of about 1.07, compared to the power of about 0.89 and maximum intensity ratio of about 1.15 of inventive example I1.1.

Comparative example C2 has almost the same power and maximum intensity ratio as inventive examples I1.1 and I1.2. However, comparative example C2 has much smaller apex angle (about 41°) compared to inventive examples I1.1 and I1.2 having apex of about 68°, which means an easier fabrication of the turning films of the present invention.

The advantage of the turning film of the present invention is its high maximum intensity ratio (optical gain), and its large apex angle which enables its easy manufacture.

Turning Film Having 4 Slopes on the Near Surface

Figure 3B:
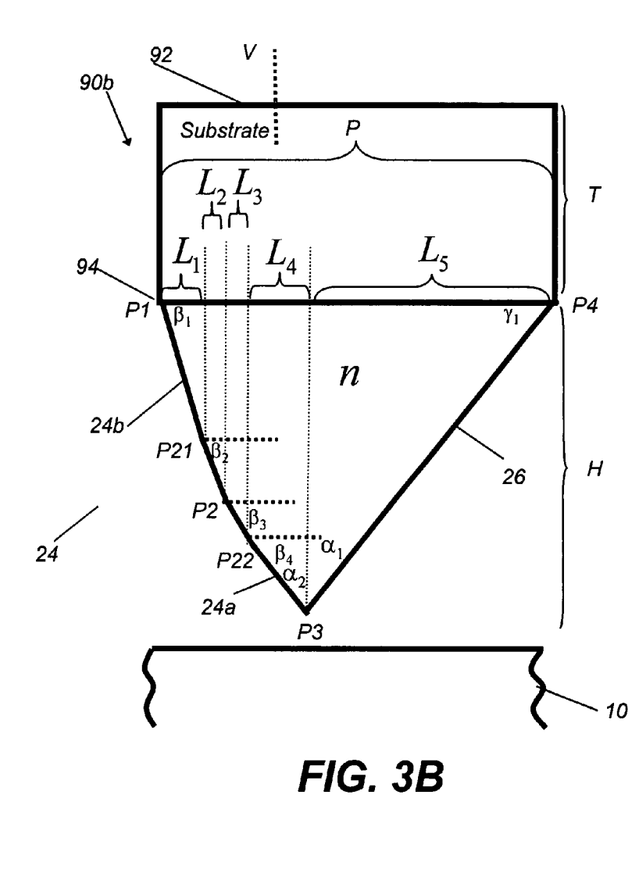
FIG. 3B is a schematic cross-sectional view showing a single unit of a turning film having four slopes on the near surface of the prismatic structures according to the present invention.

FIG. 3B shows another embodiment of the turning film 90b according to the present invention. One example is:

| Ex | $L_1/P$ | $L_2/P$ | $L_3/P$ | $L_4/P$ | $\beta_1$ (°) | $\beta_2$ (°) | $\beta_3$ (°) | $\beta_4$ (°) | $\alpha_1$ (°) | $\alpha_2$ (°) | $\alpha$ (°) |
|---|---|---|---|---|---|---|---|---|---|---|---|
| I6 | 0.06535 | 0.02678 | 0.05680 | 0.09402 | 85 | 77.76 | 63.25 | 56 | 34 | 34 | 68 |

When n=1.5,

| Power | Maximum Intensity Ratio | Maximum Intensity angle (°) | On-axis Intensity ratio |
|---|---|---|---|
| 0.893 | 1.271 | −2.5 | 1.214 |

The inclination angle of one of flat surfaces closest to light exit surface, is $\beta_1=85°$, and the inclination angle of the other one of flat surfaces farthest from light exit surface, is $\beta_4=56°$. Thus, the difference between them is 29°. In addition, the difference between the other two inclination angles is $\beta_2-\beta_3=14.51°$, which is greater than $\beta_1-\beta_2=7.24°$, $\beta_3-\beta_44=7.25°$. Moreover, $\beta_2-\beta_3$ is about twice of $\beta_1-\beta_2$ and $\beta_3-\beta_4$.

Turning Film Having 2 Slopes and Curved Surface on the Near Surface

Figure 3C:
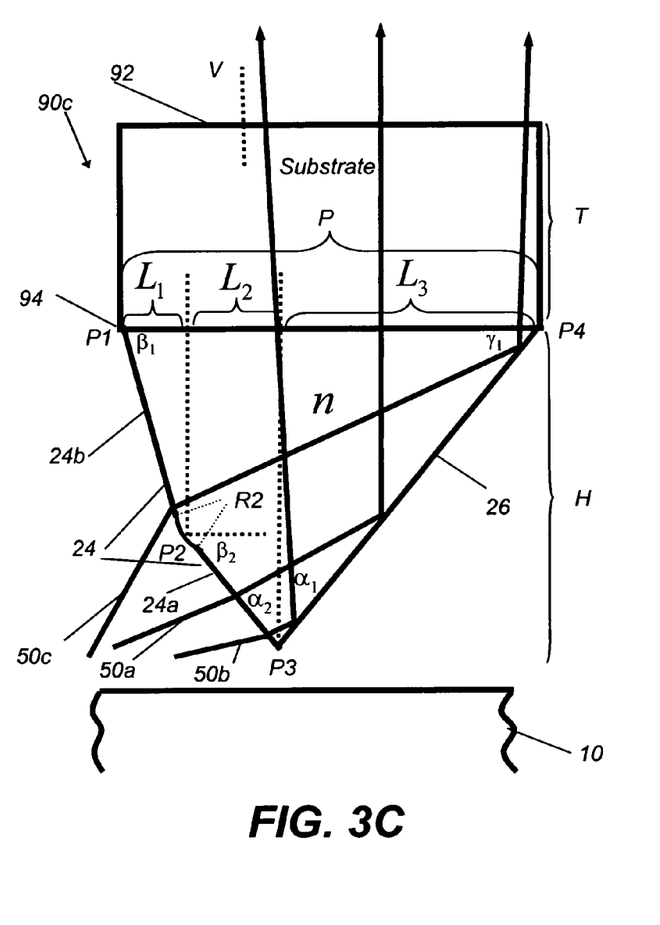
FIG. 3C is a schematic cross-sectional view showing a single unit of a turning film having a curved surface and two slopes on the near surface of the prismatic structures according to the present invention.

FIG. 3C shows another embodiment of the turning film 90c according to the present invention. The point P2 in FIG. 3A is now replaced with a curved surface of radius R2 (N=1.5).

| $L_1/P$ | $L_2/P$ | $\beta_1$ (°) | $\beta_2$ (°) | $\alpha_1$ (°) | $\alpha_2$ (°) | $\alpha$ (°) |
|---|---|---|---|---|---|---|
| 0.076 | 0.16903 | 85 | 56 | 34 | 34 | 68 |

| Ex | $R_2/P$ | Power | Maximum Intensity Ratio | Maximum Intensity angle (°) | On-axis Intensity ratio |
|---|---|---|---|---|---|
| I7.1 | 0.1 | 0.892 | 1.234 | −0.5 | 1.227 |
| I7.2 | 0.2 | 0.893 | 1.259 | 0.5 | 1.240 |
| I7.3 | 0.3 | 0.893 | 1.272 | −2.5 | 1.240 |
| I7.4 | 0.4 | 0.894 | 1.292 | −1.5 | 1.232 |
| I7.5 | 0.5 | 0.895 | 1.312 | −1.5 | 1.221 |
| I7.6 | 0.6 | 0.895 | 1.300 | −1.5 | 1.217 |
| I7.7 | 0.8 | 0.897 | 1.274 | −1.5 | 1.226 |
| I7.8 | 1.0 | 0.898 | 1.216 | 0.5 | 1.207 |
| I7.9 | 1.16882 | 0.899 | 1.175 | −1.5 | 1.128 |

Though all of above inventive examples I7.1-I7.9 meet the criteria, it has been found that $R_2/P$ is preferably in the range of 0.1 to 1.16882, more preferably in the range of 0.3 and 0.8, and most preferably in the range of 0.4 and 0.6 for further enhancement of maximum intensity ratio.

The point P3 can also be curved with radius of curvature $R_3$. $R_3/P$ is preferably smaller than 0.2.

Figure 3D:
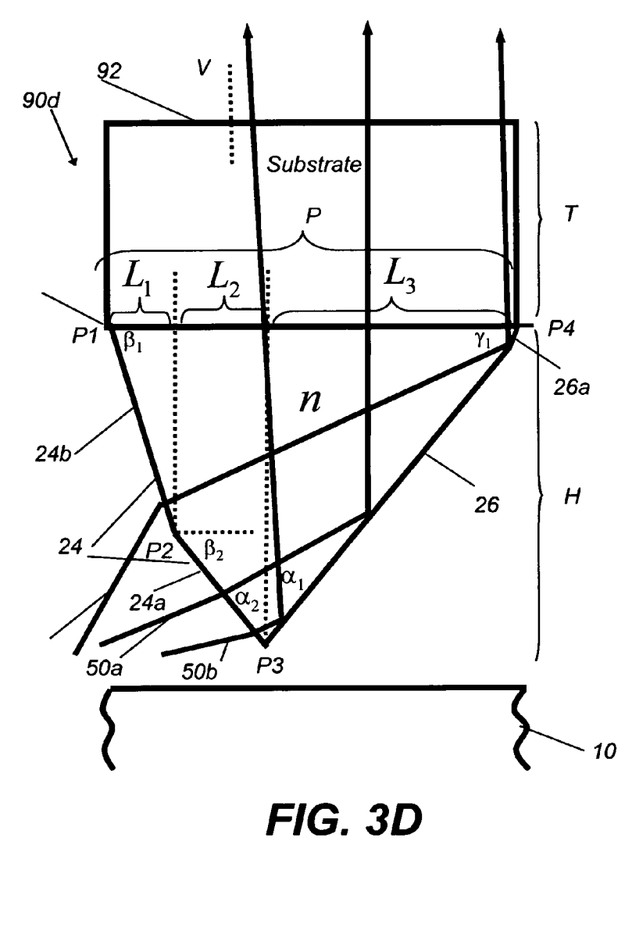
FIG. 3D is a schematic cross-sectional view showing a single unit of a turning film having two slopes on the near surface and two slopes on the far surface of the prismatic structures according to the present invention.

Turning Film Having 2 Slopes on the Near Surface and Curved Surface or Two Segments on Far Surface FIG. 3D shows another embodiment of turning film 90d according to the present invention. The turning film 90d has the same features on the near surface 24 as one of turning films 90a, 90b, 90c, and it also has one additional surface 26a, which is either flat segment having different inclination as the other portion of 26, or convex or concave curved surface.

Luminous Intensity Distribution for Example Embodiments

Figure 4:
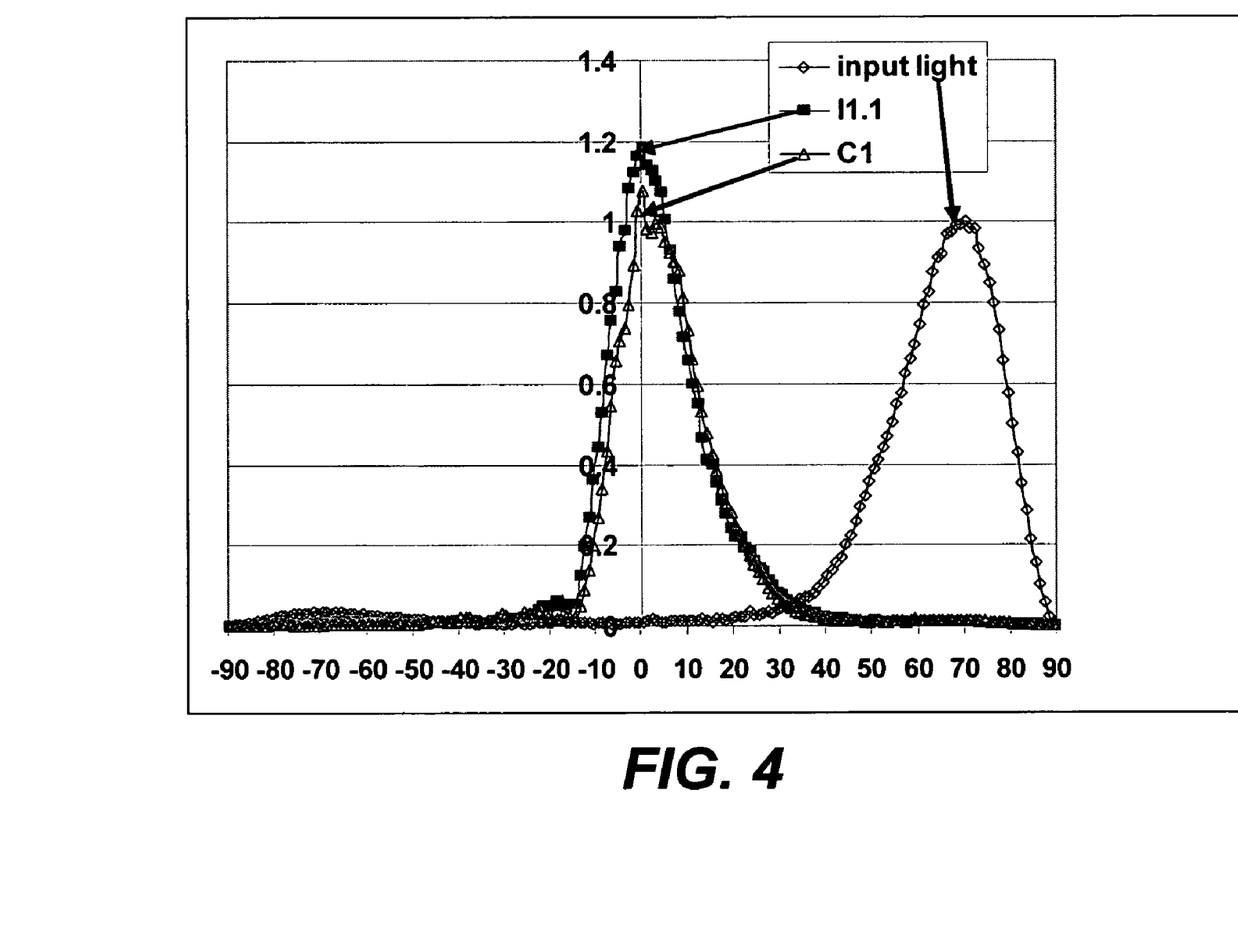
FIG. 4 show data of comparative and inventive examples.

FIG. 4 shows curves of maximum luminous intensity ratio vs polar angle for light passing through the turning films according to inventive example I1.1 and according to comparative example C1. Also shown is the luminous intensity distribution of light coming out from the light guide plate, which then is incident on the turning films. It is clearly seen that the turning film of inventive example I1.1 produces higher luminous intensity at almost every angle than the turning film of comparative example C1.

Display Apparatus and Orientation of Polarizers

Figure 5:
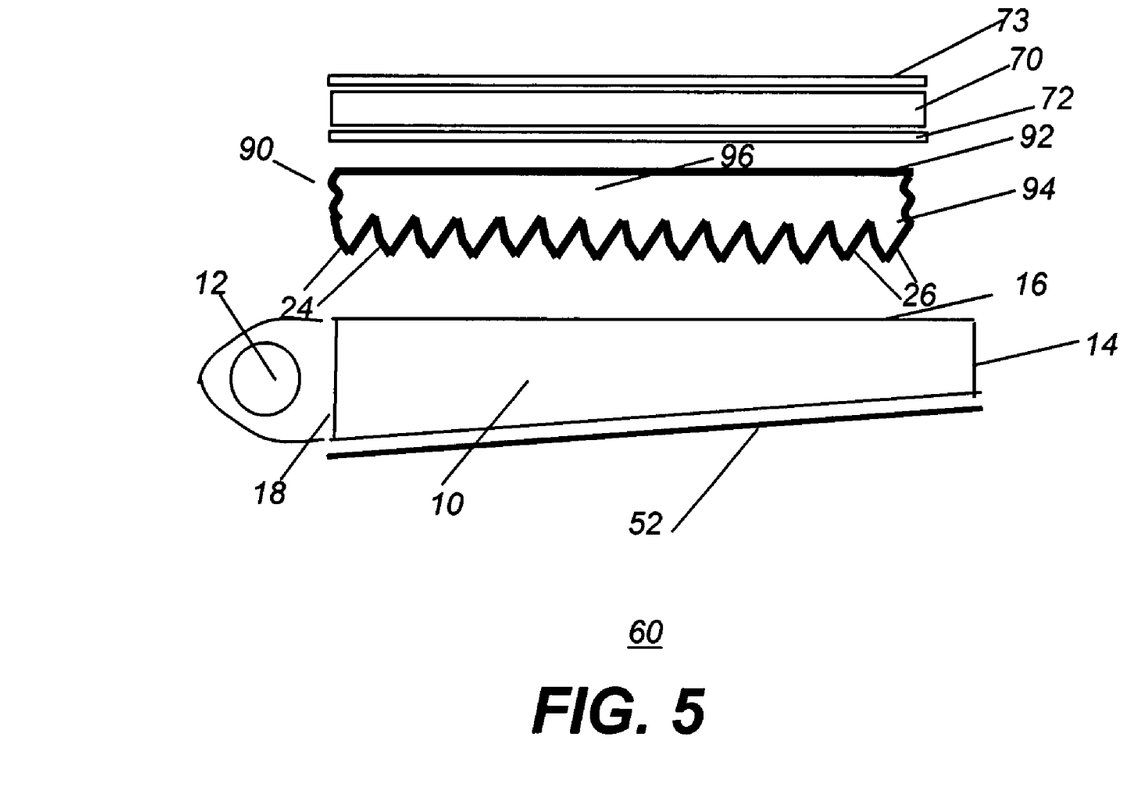
FIG. 5 is a schematic cross-sectional view showing a turning film of the present invention in an LCD display system.

The apparatus and method of the present invention allow a number of possible configurations for support components to provide light for an LCD. FIG. 5 is a schematic cross-sectional view showing a display apparatus 60 using turning film 90 according to the present invention, which can be either of turning films 90a, 90b, 90c, 90d. An LC spatial light modulator 70 modulates light received from light guiding plate 10 and turning film 90. A back polarizer 72 and a front polarizer 73 are provided for LC spatial light modulator 70.

Figure 6A:
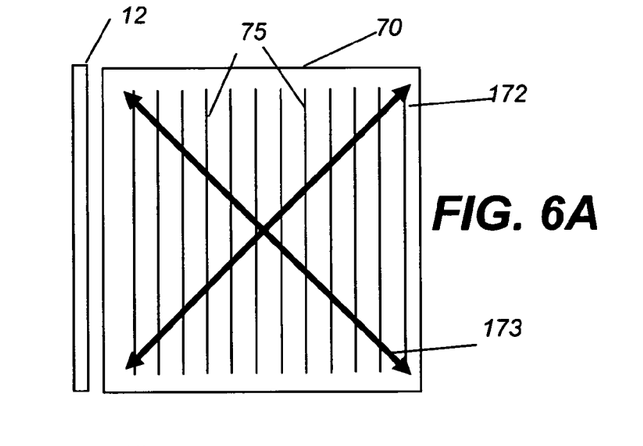
FIG. 6A is a schematic top view showing an LCD with a pair of polarizers oriented at 45 degrees relative to the grooves of the light redirecting structure of the turning film.

FIG. 6A is a schematic top view showing polarized light transmission axes 172 and 173 for LC spatial light modulator 70, using a pair of polarizers that are oriented at 45 degrees relative to light redirecting structures 75 and grooves of turning film 90 that extend vertically in the view of FIG. 6A. In this case, the LC spatial light modulator 70 can be a twisted nematic (TN) LCD, which is the dominant mode used in a notebook and monitor display.

Figure 6B:
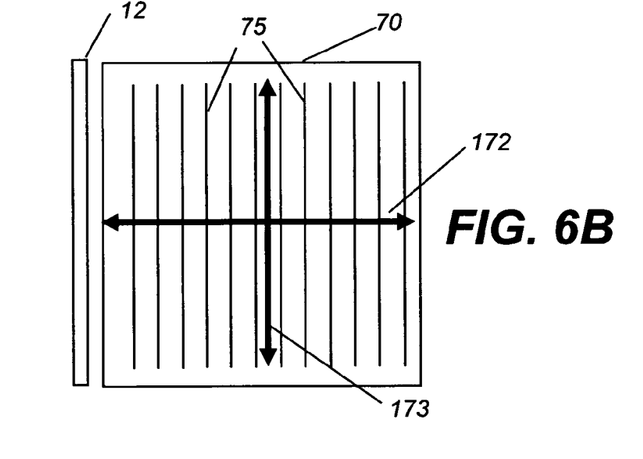
FIG. 6B is a schematic top view showing an LCD with a pair of polarizers oriented at parallel or perpendicular to the grooves of the light redirecting structure of the turning film.

FIG. 6B is a schematic top view showing polarized light transmission axes 172 and 173 for LC spatial light modulator 70, using a pair of polarizers oriented at parallel or perpendicular relative to the grooves and light redirecting structures 75 of turning film 90. In this case, the LC spatial light modulator 70 can use vertically aligned (VA) LCD or IPS LC elements. Rear polarizer transmission axis 172 is parallel to the plane of the cross section.

In one embodiment the display apparatus comprises a pair of crossed polarizers, wherein the light redirecting structures are elongated in an elongation direction and wherein each of the crossed polarizers is oriented either substantially parallel or perpendicular to the elongation direction of the light redirecting article. In another embodiment the display apparatus comprises a pair of crossed polarizers, wherein the light redirecting structures are elongated in an elongation direction and wherein the polarizers are substantially oriented at +/−45 degrees relative to the elongation direction of the light redirecting article.

Figure 6C:
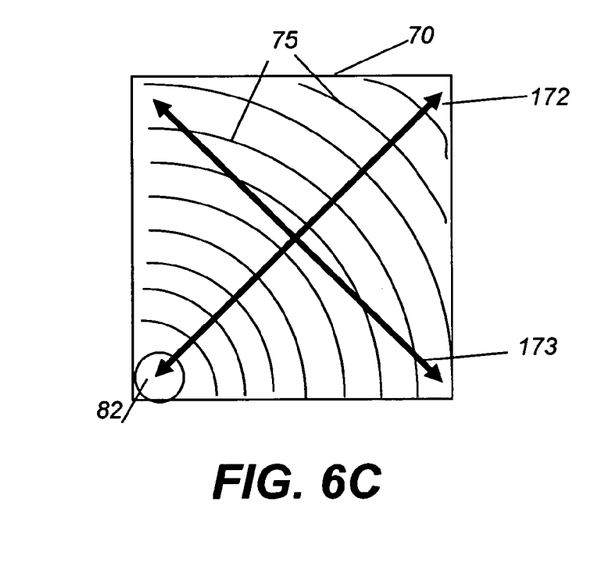
FIG. 6C is a schematic top view showing a turning film with arcuate grooves.

FIG. 6C is a schematic top view showing turning film 90 with arcuately elongated light redirecting structures 75 in another embodiment. This arrangement is advantageous for employing a point light source such as Light Emitting Diode (LED) at one or more corners of light guiding plate 10 in order to have a more compact design. The rear polarizer transmission axis 172 is more or less parallel to the plane of the cross section.

Materials for Forming Turning Film 90a-90d

Turning film 90a-90d of the present invention can be fabricated using polymeric materials having indices of refraction ranging typically from about 1.40 to about 1.66. Possible polymer compositions include, but are not limited to: poly (methyl methacrylate)s, poly(cyclo olefin)s, polycarbonates, polysulfones and various co-polymers comprising various combinations of acrylate, alicyclic acrylate, carbonate, styrenic, sulfone and other moieties that are known to impart desirable optical properties, particularly high transmittance in the visible range and low level of haze. Various miscible blends of the aforementioned polymers are also possible material combinations that can be used in the present invention. The polymer compositions may be either thermoplastic or thermosetting. The former are manufacturable by an appropriate melt process that requires good melt processability while the latter can be fabricated by an appropriate UV cast and cure process or a thermal cure process.

Turning film 90a-90d of the present invention may be fabricated using materials having an index of refraction in the range of 1.12 and 1.40. Example materials are inorganic materials, for example, MgF. Also, materials having a grating formed between a common polymeric material having refractive index in the range of 1.48 and 1.59 and air (n=1). Further, a mix of low index materials (n<1.4) and materials having indices of refraction from about 1.40 to 1.50 may be used as well.

Maximum Intensity Ratio (or Optical Gain), Maximum Intensity Angle (or Peak Angle), and Power of a Turning Film In general, light distribution is specified in terms of spatial and angular distributions. The spatial distribution of light can be made quite uniform, achieved by careful placement of micro features on top and/or bottom sides of a light guide plate. The angular distribution of light is specified in terms of luminous intensity I as a function of polar angle θ and azimuthal angle. The angular distribution of light is measured with EZ Contrast 160 (available from Eldim, France). Polar angle θ is the angle between the light direction and the normal of the light guide plate V. The azimuthal angle is the angle between the projection of the light onto a plane that is perpendicular to the normal direction V and a direction that is parallel to the length direction of the light guide plate. The length direction of the light guide plate is perpendicular to the light source 12 and the normal direction V. The angular distribution of light can also be specified in terms of luminance L as a function of polar angle θ and azimuthal angle. The luminance L and the luminous intensity I are related by L=I/cos(θ).

The maximum intensity angle, also referred as peak angle of a light distribution is defined as the polar angle at which the maximum luminous intensity occurs. Each luminous intensity distribution then defines a maximum (or peak) luminous intensity and a maximum intensity (or peak) angle.

The maximum intensity ratio, also referred as optical gain, or normalized peak intensity, of a turning film, is defined as a ratio of the maximum luminous intensity of the light that is transmitted through the turning film over the maximum luminous intensity of the light that is emitted from a light guide plate. As a result, the maximum intensity ratio of a turning film is not dependent upon the absolute level of the light source, but is primarily dependent upon the turning film design itself.

The power of a turning film is the ratio of the total amount of light passing through the turning film over the total amount of light incident upon the turning film. Thus, various turning film designs can be compared in terms of two critical quantities: maximum intensity ratio (or optical gain) and maximum intensity angle of the light that is transmitted through the turning film.

PARTS LIST

10. Light guiding plate
12. Light source
14. End surface
16. Output surface
18. Input surface
20, 20a. Turning film
22. Flat surface
24. Near surface
24a. First flat segment on Near surface
24b. Second flat segment on Near surface
26. Far surface
50a. Primary rays
50b. Secondary rays
50c, 50c1. Secondary rays
52. Reflective surface
60. Display apparatus
70. LC spatial light modulator
72. Rear polarizer
73. Front Polarizer
75. Light redirecting structure
82. Point light source
90, 90a, 90b, 90c, 90d Turning film
92. Light exiting surface
94. Light inputting surface
96. Substrate
100. Display apparatus
120. Light-gating device
124. Polarizer
125. Reflective polarizer
142. Reflective surface
172, 173. Transmission axes
α. Apex angle
$α_1$. Half apex angle
$α_2$. Half apex angle
$β_1$. base inclination angle
$β_2, β_3, β_4$. inclination angle
$γ_1$. Base inclination angle
n. Refractive index
$θ_{in}$. Incident angle for a first light guide plate
$θ_{out}$. Output angle
V. Film normal direction
S. Horizontal direction

The invention claimed is:
1. A light redirecting article for redirecting light toward a target angle, the light redirecting article comprising:
   (a) an input surface comprising a plurality of light redirecting structures each light redirecting structure having:
      (i) a near surface having two slopes, sloping away from normal in one direction as defined by a first inclination base angle $β_1$, a second inclination angle $β_2$, and a first half apex angle $α_2$, for accepting incident illumination over a range of incident angles;
      (ii) a far surface sloping away from normal, in the opposite direction relative to the near surface, as defined by a second base angle $γ_1$ and a second half apex angle $α_1$; and
   (b) an output surface opposing to the input surface wherein the near and far surfaces are opposed to each other at an angle ($α_1+α_2$) that is in the range from 60 to 70 degrees, and the base angle $β_1$ is in the range from 82 to 87 degrees.
2. The light redirecting article of claim 1 wherein the near surface has four slopes, sloping away from normal in one direction as defined by the first inclination base angle $β_1$, the second inclination angle $β_2$, a third inclination angle $β_3$, a fourth inclination angle $β_4$, and the first half apex angle $α_2$, for accepting incident illumination over a range of incident angles.
3. The light redirecting article of claim 1 wherein the near surface has a curved surface.
4. The light redirecting article of claim 1 wherein the light redirecting structure is formed of a material having a refractive index between 1.15 and 1.46.
5. The light redirecting article of claim 1 wherein the difference between $α_1$ and $α_2$ is less than 5 degrees.

* * * * *